(12) United States Patent
Keller-Tuberg et al.

(10) Patent No.: US 7,995,609 B2
(45) Date of Patent: Aug. 9, 2011

(54) INTEGRATED SERVER MODULE AND METHOD OF RESOURCE MANAGEMENT THEREFOR

(75) Inventors: Stefan Keller-Tuberg, Kareela (AU); Josh Bailey, Raleigh, NC (US); Eric Jaramillo, Holly Springs, NC (US)

(73) Assignee: Alcatel Lucent, Paris (FR)

( * ) Notice: Subject to any disclaimer, the term of this patent is extended or adjusted under 35 U.S.C. 154(b) by 95 days.

(21) Appl. No.: 11/985,266

(22) Filed: Nov. 14, 2007

(65) Prior Publication Data
US 2008/0069136 A1    Mar. 20, 2008

Related U.S. Application Data

(63) Continuation of application No. 10/219,959, filed on Aug. 15, 2002, now Pat. No. 7,315,553.

(51) Int. Cl.
*H04J 3/22* (2006.01)
(52) U.S. Cl. ........................ 370/463; 370/468
(58) Field of Classification Search .......... 370/464–467, 370/486–490; 709/220–222, 249, 200, 227–229, 709/245, 246
See application file for complete search history.

(56) References Cited

U.S. PATENT DOCUMENTS

| | | | |
|---|---|---|---|
| 7,027,408 B2 * | 4/2006 | Nabkel et al. | 370/252 |
| 2003/0108046 A1 * | 6/2003 | Simeone | 370/395.1 |
| 2004/0010653 A1 * | 1/2004 | Grundy et al. | 709/250 |

* cited by examiner

*Primary Examiner* — Kerri M Rose
(74) *Attorney, Agent, or Firm* — Galasso & Assoc. L.P.

(57) ABSTRACT

One embodiment of the disclosures made herein is a method for facilitating prescribed application functionality via a network element adapted for providing Digital Subscriber Line Access Multiplexing (DSLAM) functionality. In accordance with such a method, a first functionality server implements server-specific functionality whereby information associated with the server-specific functionality is generated. In response to implementing the server-specific functionality, information in a universal interface format is transmitted for reception by a first access server from a first functionality server. The first access server is connected between the network element and the first functionality server. After receiving the information, the information is translated from the universal interface format to a system-compatible interface format. The translating is performed by the first access server and the system-specific interface format is different than the universal interface format. After translating the information to the system-specific format, the information is transmitted from the first access server toward the system interface. The first access server is connected between the network element adapted and the first functionality server. The functionality server is adapted for initiating provisioning of a connection between the network element and a subscriber data processing system prior to transmitting the information toward the system interface.

17 Claims, 5 Drawing Sheets

INTEGRATED SERVER MODULE AND METHOD OF RESOURCE MANAGEMENT THEREFOR

CROSS REFERENCE TO RELATED APPLICATIONS

This United States Non-Provisional Patent Application is a Continuation of prior U.S. patent application Ser. No. 10/219, 959, entitled "Integrated Server Module And Method Of Resource Management Therefor", which was filed on Aug. 15, 2002 now U.S. Pat. No. 7,315,553.

FIELD OF THE DISCLOSURE

The disclosures made herein relate generally to Digital Subscriber Line Access Multiplexors (DSLAM) and more particularly to facilitating subscriber services from a DSLAM.

BACKGROUND

A typical telecommunications access network is a distributed arrangement of communications facilities between end users and one or many centralized network facilities. The implementation of services (e.g., streaming content, web and content caching, firewalling etc.) over the access network is implemented conventionally using server-specific platforms that are independent of the access network equipment itself. The equipment used to provide such services (i.e., the service delivery platform) is generally centrally located with respect to the telecommunications access network.

Generally, operators of telecommunications access networks are cautious about introducing changes into their networks because the integrity of their network is key in their continued viability as an operator. Because operators are cautious about deploying new equipment, they rigorously test new equipment to ensure that it will interoperate faultlessly with their existing network and operate within the engineering constraints of their facilities. Determining a new product's suitability and risk is often an arduous process for the network operator and supplier alike.

Even though service delivery platforms are commonly independent from the platform that provides the network access, telecommunications network operators generally test the proposed service delivery platform as they would any other new and independent piece of equipment within their network. New service delivery platforms are generally subjected to more rigorous tests than extensions of existing platforms because there are more aspects of an independent system that need to be examined relative to enhancements and extensions of an existing system. The complexity of testing such new service delivery platforms is an impediment to the deployment of new service platforms.

The time to launch a new service associated with a particular service delivery platform that requires complex tests is often more lengthy than for a service associated with a service delivery platform requiring less complex tests. Additionally, even though a certain service delivery platform may have passed an operator's tests, a service may not be able to be launched until a related service delivery platform has passed its tests. Furthermore, when several independent platforms must be deployed for the delivery of a particular service, the complexity of managing each of the independent platforms can become complex.

Offering a subscriber service via a service delivery platform hosted by a DSLAM presents a number of application-specific resource management issues that must be addressed in order to provide such subscriber service in an efficient and effective manner. One such issue is providing a means for fulfilling bandwidth and quality of service (QoS) requirements for subscriber connections with the DSLAM. Another such issue is providing a means for optimising the use of and minimizing the need for application-specific resources at the DSLAM. Conventional DSLAM management systems are limited in their ability to address these and other application-specific resource issues.

Therefore, a method and system capable of enabling new services and service capabilities to be deployed in a telecommunications access network in a manner that overcomes the limitations associated with conventional methods and systems is useful.

DETAILED DESCRIPTION OF THE DRAWING FIGURES

The disclosures made herein relate to an Integrated Server Module (ISM) adapted for providing prescribed server-specific functionality. The ISM is further adapted for interfacing directly with a system interface (e.g., via a backplane) of a network element adapted for providing Digital Subscriber Line Access Multiplexing functionality. Accordingly, subscriber services are capable of being hosted at a network element such as a Digital Subscriber Line Access Multiplexor (DSLAM).

ISM's in accordance with an embodiment of the disclosures made herein provides a means for enabling applications adapted for being hosted by a DSLAM to be developed and implemented. However, such ISM's allows protection originally designed into the DSLAM by use of a proprietary backplane or system interface to be retained. Generally, manufacturers of DSLAMs choose a proprietary method for implementing the backplane or system interface for interconnecting cards and modules (e.g., ISM's) within their DSLAM. DSLAM manufacturers choose proprietary interface implementations for a variety of reasons including a desire to protect the product from having third parties design interfaces or applications for it. The protection may be proprietary in terms of the connectors which are used, in terms of the signal designations assigned to the various pins on the connectors, in terms of the electrical characteristics of the signals on individual pins, in terms of the structure of the information sent in the signals between the system interface and the card or module, in terms of the messaging protocol between the card and the DSLAM (used for configuration and management of the card) and also in other ways known to those familiar in the art of DSLAM and telecommunications equipment system design. Often, dedicated Application Specific Integrated Circuits (ASICs) are required to interpret the proprietary information structure, which are themselves proprietary devices.

Figure 1:
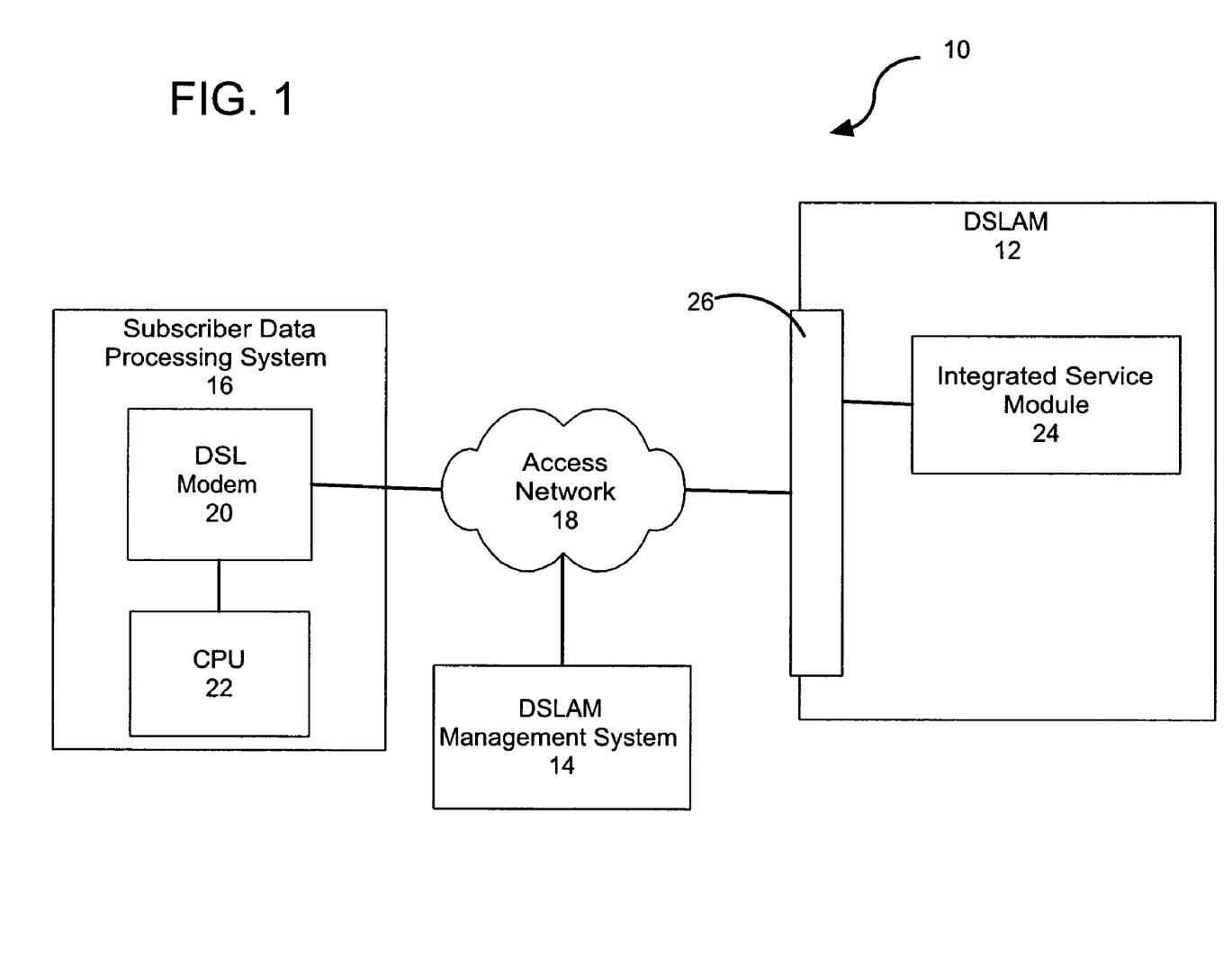
FIGS. 1 and 2 are block diagrams depicting an embodiment of a communication network in accordance with the disclosures made herein.
Figure 2:
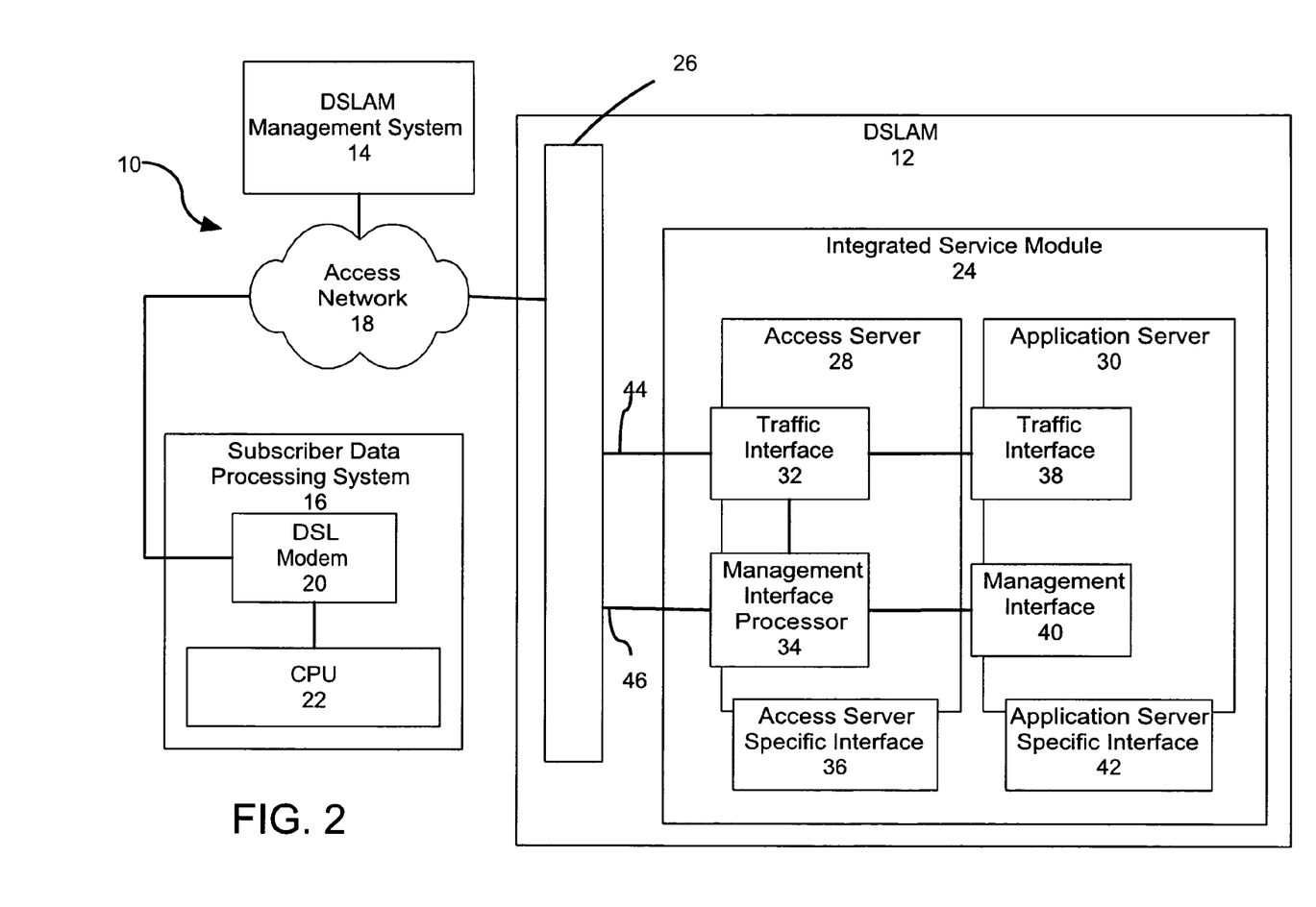

Referring to FIGS. 1 and 2, an embodiment of a communication system 10 in accordance with the disclosures made herein is depicted. The communication system 10 includes a Digital Subscriber Line Access Multiplexor (DSLAM) 12, a DSLAM management system 14, a subscriber data processing system 16 and an access network 18. The DSLAM 12 is an example of a network element adapted for providing digital subscriber line access multiplexing functionality. A computer running a data processing program adapted for monitoring and/or affecting the operation of the DSLAM 12 is an example of the DSLAM management system 14.

The DSLAM 12, DSLAM management system 14 and subscriber data processing system 16 are each connected to the access network 18. The subscriber data processing system 16 includes a DSL modem 20 and a central processing unit (CPU) 22. The DSL modem 20 is connected between the access network 18 and the CPU 22 for facilitating communication between the access network 18 and the CPU 22. A personal computer and a set-top box are examples of the CPU 22.

An integrated service module (ISM) 24 is connected to the DSLAM 12. The ISM 24 is connected to the DSLAM 12 via a system interface 26 of the DSLAM 12. A backplane is a physical embodiment of the system interface 26. A card adapted for being connected to a backplane of an apparatus such as the DSLAM 12 is an example of a physical package of the ISM 24. As depicted, the ISM 24 is mounted within the DSLAM 12. It is contemplated that the ISM 24 may be located external to the DSLAM 12 in other embodiments of the disclosures made herein.

As depicted in FIG. 2, the ISM 24 includes a Universal Access Server (UAS) 28 and an Application Server (AS) 30. The UAS 28 is adapted translating signalling and/or traffic information exchanged between the ISM 24 and the DSLAM 12 between a proprietary interface format (i.e., a system-specific interface format) of the DSLAM 12 and a universal interface format (i.e., non-proprietary interface format) suitable for interfacing to a third party application. The ISM 24 enables functionality provided by the AS 30 to be accessed by subscriber data processing systems (e.g., the subscriber data processor system 16) connected to that DSLAM 12 or to any subscriber data processing systems subtended from the DSLAM 12. Examples of such functionality include, but are not limited to, establishing an interface with a subscriber data processing system, offering a service to a subscriber data processing system, establishing an interface with a remote network system or a combination thereof. The AS 30 is an example of a third party application adapted for communicating via the universal interface format. In effect, the ISM 24 extends the capabilities of the DSLAM 12 by providing an internal interface onto which the AS 30 may be connected.

A published interface format and an industry standardized interface format are examples of the universal interface format. A published interface format refers to an interface format for which a party publicly provides reference designs of hardware, software and the like required for achieving intended interface functionality. It is contemplated herein that the design of the UAS 28 may be licensed, or otherwise made available, so that third party designers may have a simplified and application independent method for interfacing towards the heart of the DSLAM 12.

Use of the universal interface format enables third party developers the ability to quickly and relatively simply convert existing application designs for being hosted by the DSLAM 12. Similarly, a third party designer may create a new application from scratch, and because the interface to the DSLAM is based on industry standard or provided designs, the task of interfacing to the DSLAM 12 is greatly simplified. Video services, firewalling services, information storage services and the like are examples of functionality that may be provided by an application server in accordance with an embodiment of the disclosures made herein.

Third party application designs, when integrated into a DSLAM via an ISM in accordance with an embodiment of the disclosures made herein this fashion, appear tightly integrated from the perspective of network design, traffic engineering, network management, physical location and deployment. Furthermore, a DSLAM designer need not develop a different interface for each type of application. Accordingly, by providing a generic, standard and open interface to third party designers, the degree of support activity required by the DSLAM designer is reduced.

Referring to FIG. 2, the UAS 28 includes a traffic interface 32, a management interface processor 34 and an access server specific interface 36. The AS 30 includes a traffic interface 38, a management interface 40 and the application server specific interface 42. The traffic interface 32 of the UAS 28 is connected to the traffic interface 38 of the AS 30. The management interface processor 34 of the UAS 28 is connected to the management interface 40 of the AS 30. The traffic interface 32 of the UAS 28 and the management interface processor 34 of the UAS 28 are connected for providing an alternate traffic and management path. The traffic interface 32 and the management interface processor 34 of the UAS 28 are connected to the DSLAM 12 via a traffic portion 44 and a management portion 46, respectively, of the system interface 26. The traffic portion 44 and the management portion 46 may be logically or physically different components of the system interface 26.

The management interface processor 34 is adapted for enabling provisioning of the UAS 28 in response to changes in the system interface 26 of the DSLAM 12. The access server-specific interface 36 is adapted for facilitating at least one of functionality for indicating common state information and functionality for debugging the system interface. The application server specific interface 42 is adapted for facilitating at least one of functionality for indicating application-server specific conditions, functionality for debugging the application server interface and functionality for enabling application specific interfaces.

The ISM 24 is adapted for initiating provisioning of a connection (i.e., a DSL connection) between the DSLAM 12 and the subscriber data processing system 16. Accordingly, in the case of a bandwidth intensive subscriber service, the ISM 24 is able to initiate such provisioning of the connection. In at least one embodiment, the provisioning is implemented by the DSLAM 12 and/or DSLAM management system 14. Through such provisioning, various parameters may be affected for enabling a service to be effectively provided to a subscriber. Parameters relating to bandwidth and Quality of Service (QoS) are examples of such various parameters. The provisioning may result in a permanent change (e.g., an upgrade or downgrade to a service) or temporary change (i.e., for a prescribed duration of time) in the connection configuration. Because the ISM 24 is hosted by the DSLAM, subscriber services may be offered with a high reliability of service and quality of service by allowing 'on-the-fly' provisioning of the subscriber's service.

For example, a subscriber requests access to a service or content managed by the ISM 24. The ISM 24 then communicates with the DSLAM 12 and/or the DSLAM management system 14 to assess the subscriber's current service configuration. Examples of parameters assessed include parameters associated with bandwidth and Quality of Service. If the subscriber's current service configuration cannot support the requested service/content, the ISM 24 issues a request to the DSLAM 12 and/or DSLAM management system 14 to upgrade the service to a specified, acceptable level. In response, the DSLAM 12 and/or DSLAM management system 14 will implement provisioning the subscriber's service (e.g. DSL connection) to the specified, acceptable level. After delivery of the service or content, the ISM 24 determines whether the provisioning is intended to be permanent or temporary and initiates any subsequent actions for additional provisioning of the subscriber's service.

Figure 3:
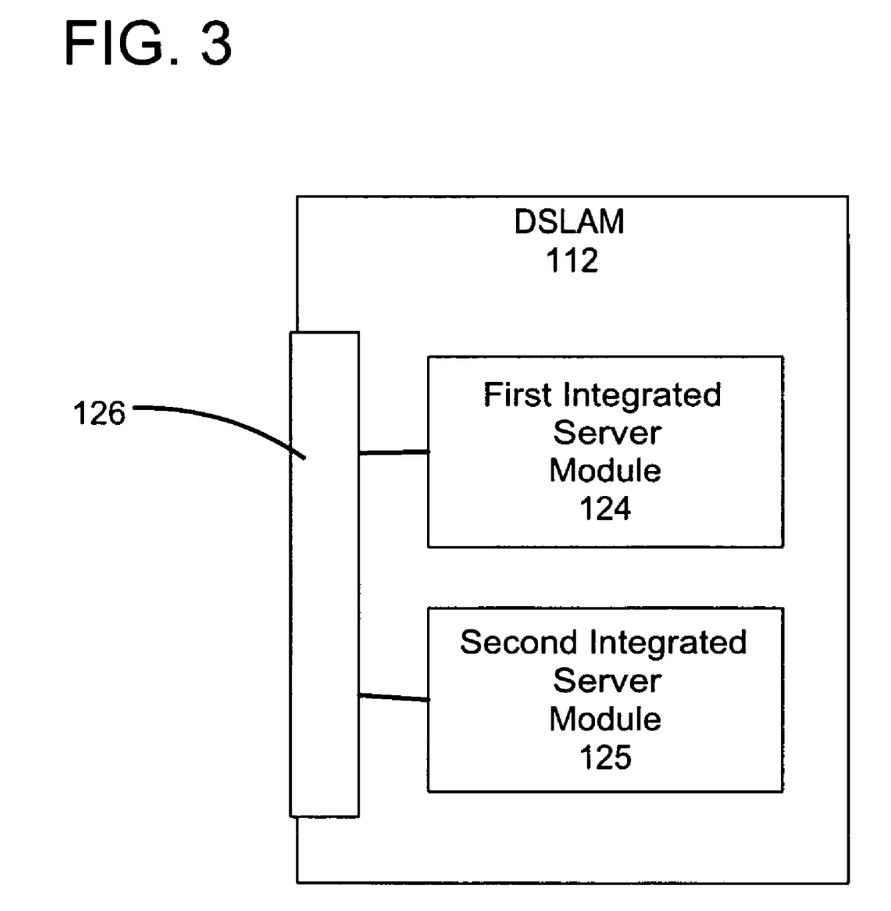
FIG. 3 is a block diagram depicting an embodiment of a DSLAM having a plurality of integrated service modules attached thereto in accordance with the disclosures made herein.

FIG. 3 depicts an embodiment of a DSLAM 112 having a first ISM 124 and a second ISM 125 connected to a system interface 126 of the DSLAM 112. It is contemplated that functionality associated with the DSLAM and ISM described in reference to FIGS. 1 and 2 may be provided by the DSLAM 112 depicted in the first ISM 124 and the second ISM 125 depicted in FIG. 3, even though such functionality is not specifically discussed in reference to FIG. 3. For example, the first ISM 124 may be adapted for initiating provisioning of a connection between the DSLAM 112 and a subtended subscriber data processing system (not specifically shown in FIG. 3).

The first ISM 124 is connected to the second ISM 125 in accordance with the access server functionality disclosed herein. Accordingly, a traffic interface, a management interface or both are capable of being established between the first ISM 124 and the second ISM 125. Although not specifically shown, it is contemplated and disclosed herein that a direct external connection may be provided between the first ISM 124 and the second ISM 125 for supporting certain types of service conditions (e.g., high levels of data transfer).

The first ISM 124 is adapted for providing a first type of server-specific functionality and the second ISM 125 is adapted for providing a second type of server-specific functionality different than the first type of server-specific functionality. Processing information, storing information, retrieving information, managing a subscriber service and enabling management of the subscriber service are examples of various types of server-specific functionality. Processing subscriber service request and storing/retrieving information associated with the service request are examples of managing a subscriber service and enabling management of the subscriber service, respectively. Accordingly, it is contemplated herein that a first type of server-specific functionality provided by the first ISM 124 might be at least partially dependent on a second type of server-specific functionality provided by the second ISM 125.

In this manner, if the first ISM 124 requires additional resources (e.g., memory, storage, processing, caching, routing, interfaces etc), the second ISM 125 is adapted and capable of providing such additional resources. Because the application server of the first ISM 124, for example, need not be designed with all of the required resources and be completely self-sufficient, the expense, size, and power of the ISM 124 as well as the second ISM 125 can be maintained within preferred constraints. Accordingly, by allowing ISM's to share each other's resources, ISM's offering certain types of functionality may be designed to operate more efficiently, to be expandable, and to be less costly to design and build.

Each one of a plurality of ISM's connected to a DSLAM may have cross-connections (i.e., inter-connections via a system interface of the DSLAM) with several of the other ISM's connected to the DSLAM. For example, two different ISM's providing video services may be cross-connected in a manner for share the resources of a common ISM providing storage functionality. In such an example, the ISM offering storage functionality would assign a portion of drive space to each ISM via respective cross-connects.

Figure 4:
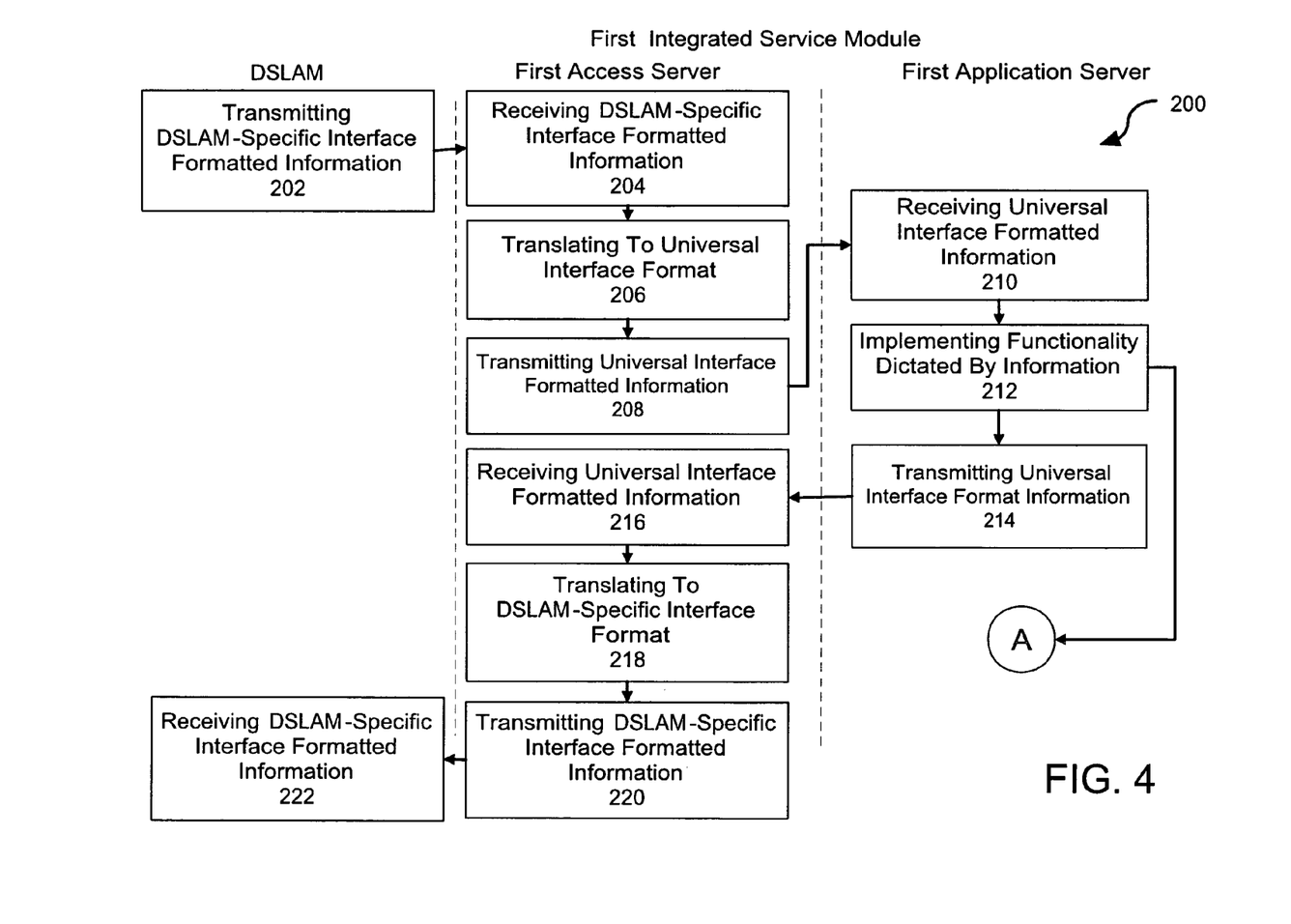
FIGS. 4 and 5 is a flow chart view depicting an embodiment of a method for facilitating application specific functionality via integrated service modules hosted by a network element adapted for providing Digital Subscriber Line Access Multiplexing functionality.
Figure 5:
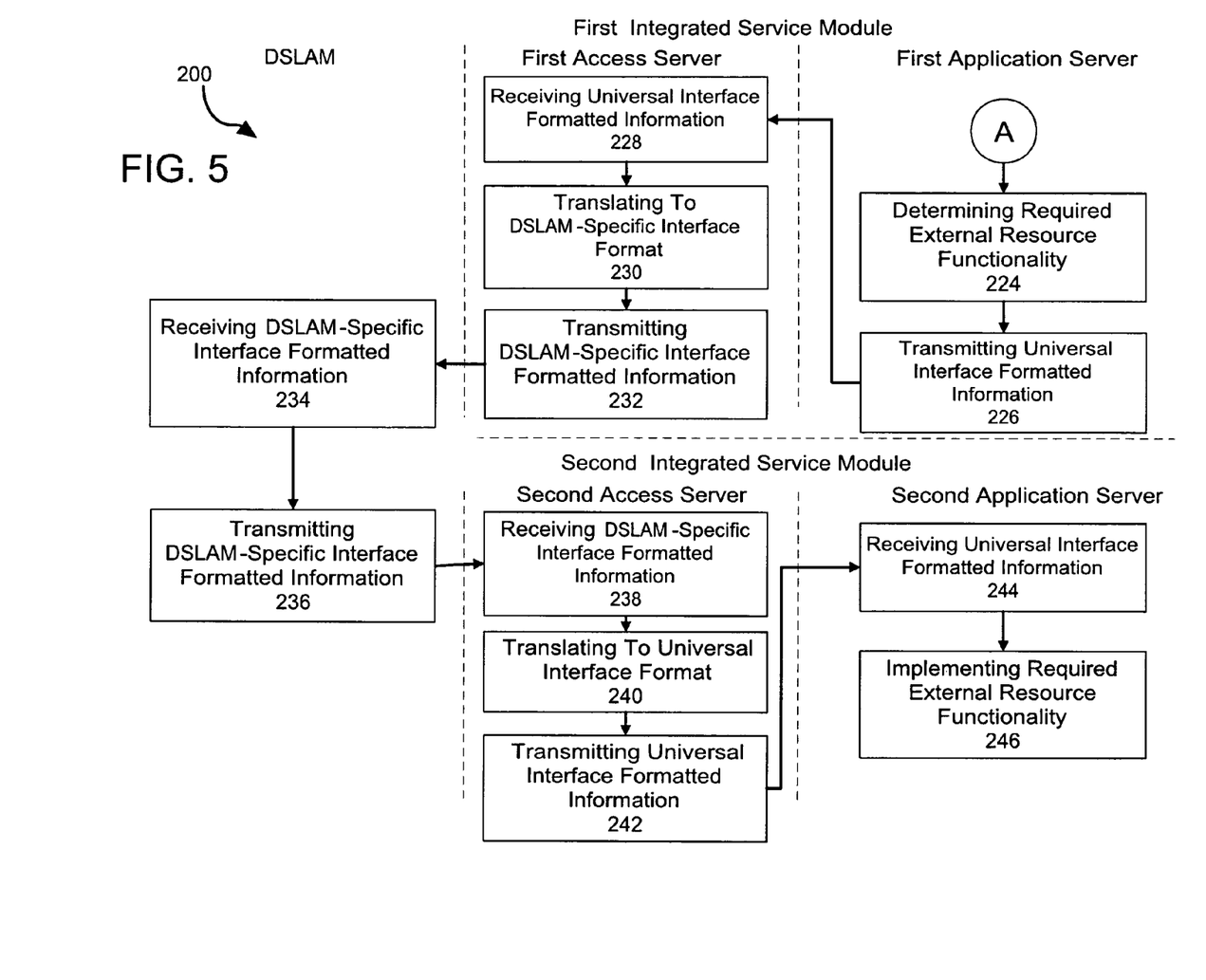

FIGS. 4 and 5 depicts an embodiment of a method 200 for facilitating application specific functionality via a plurality of ISM's hosted by a network element adapted for providing Digital Subscriber Line Access Multiplexing (DSLAM) functionality. The method 200 includes an operation 202 for transmitting information in a DSLAM-specific interface format (i.e. system-specific interface formatted information) from the DSLAM for reception by a first access server of a first integrated service module (ISM). A subscriber request for access to a service provided by the first ISM is an example of the system-specific interface formatted information transmitted at the operation 202.

In response to the first access server performing an operation 204 for receiving the system-specific interface formatted information, an operation 206 is performed by the first access server for translating the system-specific interface formatted information to universal interface formatted information. After translating the system-specific interface formatted information, the first access server performs an operation 208 for transmitting the universal interface formatted information for reception by a first application server of the first ISM. In response to the first application server performing an operation 210 for receiving the universal interface formatted information, the first application server performs an operation 212 for implementing functionality dictated by the universal interface formatted information. For example, in response to receiving a request for implementing a service provided by the first ISM (i.e., the universal interface formatted information), the application server initiates that service.

After performing at least a portion of the operation for implementing functionality dictated by the universal interface formatted information, the first application server performs and operation 214 for transmitting universal interface formatted information for reception by the first access server. An acknowledgement of an ability or inability to access the requested service of a requested file is an example of the universal interface formatted information transmitted at the operation 214. The designated file is an example of the universal interface formatted information transmitted at the operation 214. In response to the first access server performing an operation 216 for receiving the universal interface formatted information, the first access server performs an operation 218 for translating the universal interface formatted information to corresponding system-specific interface formatted information. After translating the universal formatted interface information, the first access server performs an operation 220 for transmitting the system-specific interface formatted information for reception by the DSLAM. Accordingly, an operation 222 is performed by the DSLAM for receiving the system-specific interface formatted information.

At an insertion point designated in FIG. 5 as "A", the method 200 may continue with a plurality of operations for implementing resources sharing between the first ISM and a second ISM connected to the same DSLAM as the first ISM. For providing such resource sharing functionality, the method 200 continues at an operation 224 wherein the first application server determines required external resource functionality. After determining such required external resource functionality, the first application server performs an operation 226 for transmitting universal interface formatted information from the first application server for reception by the first access server of the first integrated service module (ISM). A request for retrieving or storing a designated file (e.g., a designated video file) is an example of the universal interface formatted information transmitted at the operation 226.

In response to the first access server performing an operation 228 for receiving the universal interface formatted information, an operation 230 is performed by the first access server for translating the universal interface formatted information to corresponding system-specific interface formatted information. After translating the universal interface formatted information, the first access server performs an operation 232 for transmitting the system-specific interface formatted information for reception by the DSLAM. In response to the DSLAM performing an operation 234 for receiving the system-specific interface formatted information, the DSLAM performs an operation 236 for transmitting system-specific interface formatted information for reception by a second access server (i.e., of the second ISM). In response to the second access server performing an operation 238 for receiving the system-specific interface formatted information, the second access server performs an operation 240 for translating the system-specific interface formatted information to corresponding universal interface formatted information. After translating the system-specific formatted interface information, the second access server performs an operation 242 for transmitting the universal interface formatted information for reception by a second application server (i.e., of the second ISM).

In response to the second application server performing an operation 244 for receiving the universal interface formatted information, the second application server performs an operation 246 for implementing functionality dictated by the universal interface formatted information. For example, in response to receiving a request for retrieving a designated file, the designated file is identified and retrieved. Accordingly, the second application server would facilitate retrieving the designated file and transmitting the designated file toward either the first application server or toward the subscriber data processing system designated in the originating request. It is contemplated and disclosed herein that a communication process embodied by operation 214 through operation 222 may be facilitated for transmitting the information identified at the operation 246 from the second application server for reception by the DSLAM. Similarly, it is contemplated and disclosed herein that a communication process embodied by operation 202 through 210 may be facilitated for transmitting the information identified at the operation 246 from the DSLAM for reception by the first application server.

In at least one embodiment of an integrated service module in accordance with the disclosures made herein, the ISM includes one or more one data processors and one or more data processing program for carrying out at least a portion of the functionality provided by such an ISM. The one or more data processor program controls at least a portion of the operations associated with facilitating the functionality provided by the ISM. For example a first data processor and data processor program provide functionality associated with a universal access server. Similarly, a second data processor program and data processor provide functionality associated with the application server. It is contemplated herein that such functionality may be provided by a single data processor program and a single data processor.

The one or more data processor programs may be resident on one or more data processing modules (e.g. a circuit including the one or more data processors) or may be accessible by a respective data processing module from an apparatus such as a diskette, a compact disk, a network storage device, a component of a communication system or other suitable apparatus. The term data processor program is defined herein to refer to computer software, data processor algorithms or any other type of instruction code capable of controlling operations associated with a data processor. A data processor program accessible from an apparatus by a data processor is defined herein as a data processor program product.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An integrated services module, comprising:
    an application server integrated within the integrated services module that is adapted for providing prescribed server-specific functionality and for communicating information via a universal interface format;
    an access server integrated within the integrated services module adapted for being connected between the application server and a network element and for translating said information between the universal interface format and a system-specific interface format compatible with a system interface of the network element adapted for providing Digital Subscriber Line Access Multiplexing functionality, wherein the system-specific interface format is different than the universal interface format and wherein the integrated services module is integrated within the network element.

2. The integrated services module of claim 1 wherein said prescribed server-specific application functionality includes at least one of functionality for establishing an interface with a subscriber data processing system, functionality for offering a service to the subscriber data processing system and functionality for establishing an interface with a remote network.

3. The integrated services module of claim 1 wherein:
    a first portion of the system interface is adapted for supporting communication of a traffic portion of said information; and
    a second portion of the system interface is adapted for supporting communication of a management portion of said information.

4. The integrated services module of claim 1 wherein being adapted for translating said information includes being adapted for translating said information received from the network element.

5. The integrated services module of claim 4 wherein the access server is further adapted for transmitting said information for reception by the application server after translating said information from the system-specific interface format to the universal interface format.

6. The integrated services module of claim 1 wherein:
the system-specific interface format is a proprietary interface format; and
the universal interface format is an industry standardized interface format.

7. The integrated services module of claim 1 wherein the access server includes an access server-specific interface adapted for facilitating at least one of functionality for indicating common state information and functionality for debugging the system interface.

8. The integrated services module of claim 1 wherein the application server includes an application server specific interface adapted for facilitating at least one of functionality for indicating application-server specific conditions, functionality for debugging the application server interface and functionality for enabling application specific interfaces.

9. The integrated services module of claim 1 wherein the system interface is facilitated via a backplane interface of the network element.

10. The integrated services module of claim 1 wherein the application server is further adapted for initiating provisioning of a connection between the network element and a subscriber data processing system.

11. The integrated services module of claim 10 wherein:
the application server is further adapted for assessing at least one of: a parameter associated with a subscriber quality of service and a parameter associated with bandwidth of a connection between the network element and a subscriber data processing system; and
initiating provisioning is performed after said assessing.

12. An integrated services module, comprising:
an application server adapted for providing prescribed server-specific functionality and for communicating information via a universal interface format;
an access server adapted for being connected between the application server and a network element and for translating said information between the universal interface format and a system-specific interface format compatible with a system interface of the network element adapted for providing Digital Subscriber Line Access Multiplexing functionality, wherein the system-specific interface format is different than the universal interface format; and wherein the application server is connected to the access server by an application server interface and further comprising a DSLAM management system and a subscriber data processing system connected to an access network that connects to the system interface of the network element.

13. The integrated services module of claim 12 wherein:
a first portion of the application server interface is adapted for supporting communication of a traffic portion of said information; and
a second portion of the application server interface is adapted for supporting communication of a management portion of said information.

14. The integrated services module of claim 13 wherein the access server includes a processor adapted for enabling provisioning of the access server in response to changes in the system interface and wherein the prescribed server-specific application functionality includes video services, firewalling services and information storage services.

15. The integrated services module of claim 12 wherein being adapted for translating said information includes translating information received from the application server and wherein the subscriber data processing system includes a DSL modem and a CPU and wherein the DSL modem is connected between the access network and the CPU.

16. The integrated services module of claim 15 wherein the access server is further adapted for transmitting said information toward the system interface after translating said information from the universal interface format to the system-specific interface format.

17. An integrated services module, comprising:
an application server adapted for providing prescribed server-specific functionality and for communicating information via a universal interface format;
an access server adapted for being connected between the application server and a network element and for translating said information between the universal interface format and a system-specific interface format compatible with a system interface of the network element adapted for providing Digital Subscriber Line Access Multiplexing functionality, wherein the system-specific interface format is different than the universal interface format and wherein the access server contains an access server traffic interface connected to the system interface of the network element and to an application server traffic interface within the application server and wherein the access server contains an access server management interface connected to the system interface of the network element and to an application server management interface within the application server.

* * * * *